United States Patent
Granger et al.

(10) Patent No.: US 10,691,085 B2
(45) Date of Patent: Jun. 23, 2020

(54) DEFECT DETECTION IN POWER DISTRIBUTION SYSTEM

(71) Applicant: INVENTUS HOLDINGS, LLC, Juno Beach, FL (US)

(72) Inventors: John F. Granger, North Palm Beach, FL (US); Yi Li, Palmetto Bay, FL (US); Hooman Yousefizadeh, Port St. Lucie, FL (US); Donville D. Smith, Royal Palm Beach, FL (US); Carmine A. Priore, III, Wellington, FL (US)

(73) Assignee: INVENTUS HOLDINGS, LLC, Juno Beach, FL (US)

( * ) Notice: Subject to any disclaimer, the term of this patent is extended or adjusted under 35 U.S.C. 154(b) by 396 days.

(21) Appl. No.: 15/622,536

(22) Filed: Jun. 14, 2017

(65) Prior Publication Data
US 2018/0366979 A1    Dec. 20, 2018

(51) Int. Cl.
| | |
|---|---|
| *G06F 11/30* | (2006.01) |
| *G21C 17/00* | (2006.01) |
| *G05B 15/02* | (2006.01) |
| *H02S 50/10* | (2014.01) |
| *H02J 3/38* | (2006.01) |
| *H02J 13/00* | (2006.01) |
| *F03D 17/00* | (2016.01) |
| *H02J 3/00* | (2006.01) |

(52) U.S. Cl.
CPC .............. *G05B 15/02* (2013.01); *H02J 3/381* (2013.01); *H02S 50/10* (2014.12); *F03D 17/00* (2016.05); *H02J 3/001* (2020.01); *H02J 3/383* (2013.01); *H02J 3/386* (2013.01); *H02J 13/0006* (2013.01)

(58) Field of Classification Search
CPC ........... G05B 15/02; H02S 50/10; H02J 3/381
USPC ......................................................... 702/182
See application file for complete search history.

(56) References Cited

U.S. PATENT DOCUMENTS

| | | | |
|---|---|---|---|
| 8,121,741 B2 | 2/2012 | Taft et al. | |
| 9,547,033 B1 | 1/2017 | Batten et al. | |
| 9,591,088 B2 | 3/2017 | Hyman et al. | |
| 2007/0255832 A1* | 11/2007 | Riesberg ............. | H04L 61/2015 709/226 |
| 2011/0153236 A1 | 6/2011 | Montreuil et al. | |
| 2013/0346917 A1 | 12/2013 | Bragdon et al. | |
| 2014/0253043 A1* | 9/2014 | Cho ..................... | G08B 21/182 320/134 |

(Continued)

OTHER PUBLICATIONS

Schneider Electric: "*Predictive Asset Analytics at Power Utilities*"; found on the internet at http://software.schneider-electric.com/pdf/industry-solution/predictive-asset-analytics-at-power-utilities/, Dec. 2015.

(Continued)

*Primary Examiner* — Michael P Nghiem
(74) *Attorney, Agent, or Firm* — Tarolli, Sundheim, Covell & Tummino LLP

(57) ABSTRACT

A defect detector can receive measured data characterizing an operational performance of a population of sets of parallel operating power sources of a power supplier for a power distribution system. The defect detector can employ statistical analysis to detect a potential defect in a subset of the parallel operating power sources of the power supplier based on the measured data. Each of the parallel operating power sources can be configured to provide a given output in response to a given input.

11 Claims, 7 Drawing Sheets

(56) References Cited

U.S. PATENT DOCUMENTS

2014/0359584 A1    12/2014  Chu
2016/0011246 A1     1/2016  Fischer et al.
2016/0218668 A1*    7/2016  Kono ................ H01L 31/02021
2017/0259687 A1*    9/2017  Chikkannanavar ..........................
                                                        B60L 11/1861
2017/0358934 A1*   12/2017  Miller ................ G01R 31/3648

OTHER PUBLICATIONS

Goyal, et al: "*Asset Health Management Using Predictive and Presciptive Analytics for the Electric Power Grid*"; IBM Journal of Research and Development 60.1 (2016): 4-1.

Chappel: "*Big Data Creates Predictive Maintenance Opportunities*"; found on the internet at http://www.elp.com/articles/powergrid_international/print/volume-19/issue-4/features/big-data-creats-predictive-maintenance-opportunities.html, Apr. 15, 2014.

\* cited by examiner

DEFECT DETECTION IN POWER DISTRIBUTION SYSTEM

TECHNICAL FIELD

The present disclosure relates to systems and methods for detecting a potential defect in a power provider of a power distribution system.

BACKGROUND

A photovoltaic (PV) module is a packaged, connected assembly of photovoltaic solar cells. Photovoltaic modules constitute the photovoltaic array of a photovoltaic system that generates and supplies electricity in commercial and residential applications. Each photovoltaic module is rated by the module's direct current (DC) output power under standard test conditions (STC). The output of a photovoltaic module typically ranges from about 100 to about 365 Watts (W). A single photovoltaic module (solar module) can produce only a limited amount of power and most solar arrays contain multiple modules. A photovoltaic system typically includes an array of photovoltaic modules, an inverter, a battery pack for storage and interconnection wiring.

A Mahalanobis distance is a measure of the distance between a point P and a distribution D. It is a multi-dimensional generalization of the idea of measuring how many standard deviations away P is from the mean of D. This distance is zero if P is at the mean of D, and grows as P moves away from the mean: along each principal component axis, the Mahalanobis distance measures the number of standard deviations from P to the mean of D. If each of these axes is rescaled to have unit variance, then Mahalanobis distance corresponds to standard Euclidean distance in the transformed space. Mahalanobis distance is thus unitless and scale-invariant, and takes into account the correlations of the data set.

In statistics, an outlier is an observation point that is distant from other observations. An outlier may be due to variability in the measurement or it may indicate experimental error; the latter are sometimes excluded from the data set. In larger samplings of data, some data points will be further away from the sample mean than what is deemed reasonable. This can be due to incidental systematic error or flaws in the theory that generated an assumed family of probability distributions, or it may be that some observations are far from the center of the data. Outlier points can therefore indicate faulty data, erroneous procedures, or areas where a certain theory might not be valid. However, in large samples sets, a small number of outliers is to be expected (and not due to any anomalous condition).

SUMMARY

One example relates to a non-transitory machine readable medium having machine executable instructions. The machine executable instructions include a defect detector that receives measured data characterizing an operational performance of a population of sets of parallel operating power sources of a power supplier for a power distribution system. The defect detector can employ statistical analysis to detect a potential defect in a subset of the parallel operating power sources of the power supplier based on the measured data. Each of the parallel operating power sources can be configured to provide a given output in response to a given input.

Another example relates to a system that includes a power provider for a power distribution system. The power provider can include a plurality of power sources that are each operating in parallel and each power source can be configured to provide a given output in response to a given input. The power provider can also include a plurality of data monitors that monitor the output of each of the plurality of parallel power sources. The system can also include a memory for storing machine executable instructions and a processing unit comprising one or more processor cores that access the memory and executes the machine readable instructions. The machine readable instructions can include a defect detector that receives data characterizing the output of each of the plurality of power sources from the plurality of data monitors. The defect detector can employs multiple types of statistical analysis to detect a potential defect in a given set of the parallel power sources. The machine readable instructions can also include a graphical user interface that outputs a report identifying the given set of parallel power sources.

Yet another example relates to a method that includes receiving measurement data from a plurality of data monitors that characterizes the operational performance of a plurality of power sources of a power provider for a power distribution system operating in parallel. The method can also include executing statistical analysis on the measurement data to identify a set of power sources that have a potential defect. Each of the plurality of power sources can be designed to provide the same output in response to the same stimulus.

DETAILED DESCRIPTION

Figure 1:
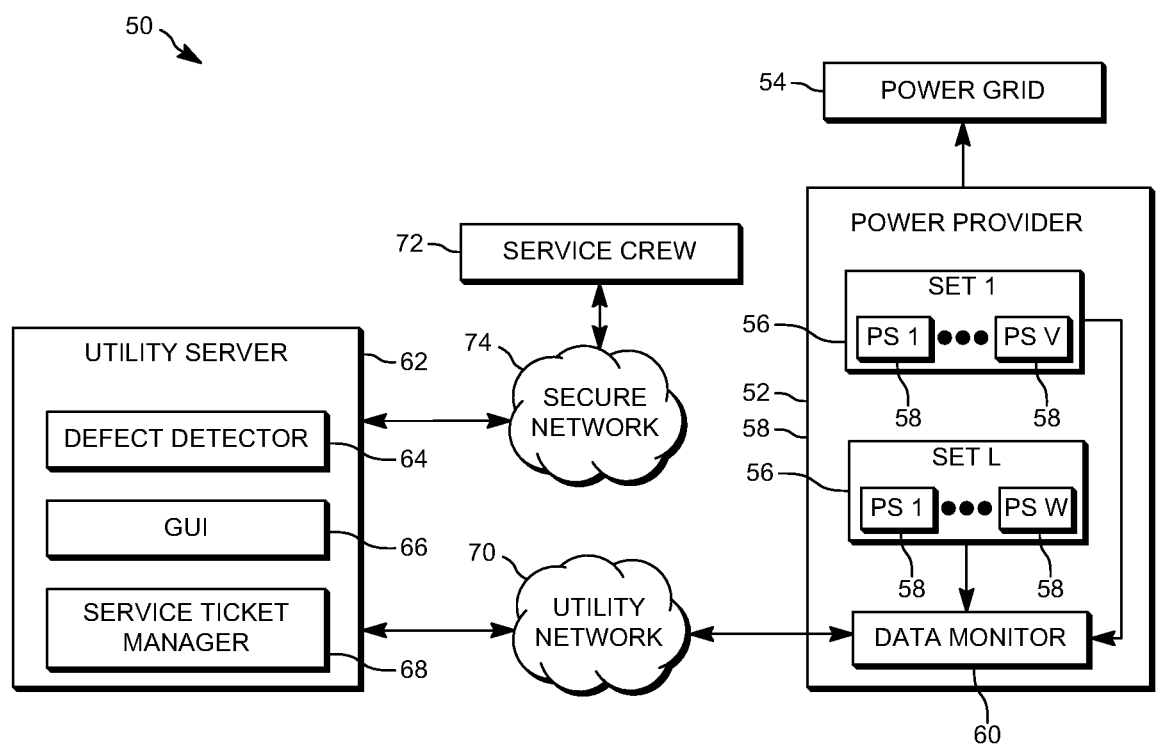
FIG. 1 illustrates an example of a power distribution system that detects potential defects in a power provider.

This disclosure relates to systems and methods for detecting potential defects (anomalies) in a power provider (e.g., a parallel power system) of a power distribution system that include multiple instances of power sources operating in parallel. Each power source can be the same (e.g., identical). The power provider could be a solar array (e.g., a solar power generation facility with DC/AC inverters), a battery system (e.g., battery storage center with battery cells), a thermal solar field with absorber loops or a wind farm (e.g., wind turbines with the same type of gearboxes). A utility scale power supplier may include hundreds, thousands or even millions of individual power sources operating in parallel. Accordingly, individual equipment reliability management can be an onerous task and failing to respond to equipment malfunctions in a timely manner due to low detection rate and/or low accuracy can lead to lost productivity by the power provider.

Conventional anomaly detection employed in power sources with parallel power sources compares a key process indicator (KPI) to a fixed threshold. Such thresholds may be determined "offline", e.g., using manufacturer's factory setting or historical experience, and these thresholds often remain constant during the entire monitoring process. However, the KPI of power sources in a power provider changes in the statistical distributions can occur during operation to individual equipment due to factors exerted from environment, man, material, machine and processes, such that the static thresholds do not adapt to the change in operation. Therefore, static thresholds may not detect anomalies occurring with high detection rate and/or high accuracy.

Accordingly, the systems and methods described herein execute statistical analysis on (real-time) measured data to detect potential defects (anomalies) of instances of equipment operating in a power provider with parallel power sources. In particular, the system can include a defect detector operating on a utility server that can receive measurement data (e.g., a KPI) characterizing the operational performance of segments of the parallel power sources (or from individual power sources). The defect detector can maintain a history of past readings and compute a statistical variant (deviation) score between each individual KPI and a centroid of the entire population at a specific moment in time. The defect detector can average the deviation scores from each moment over a period of time. The defect detector can be configured to detect a potential defect (anomaly) for a given power source when the average deviation score over the period of time exceeds an auto-determined threshold.

The defect detector can employ multiple statistical methods (concurrently) to assess individual equipment deviation scores at each moment as comparing to the whole a population, such as Z-score, interquartile range (IQR) and Mahalanobis distance. Each KPI characterized in the measurement data can be either a single measured value or an output from a pre-determined correlation of multiple measured values.

Upon detecting a potential defect (e.g., anomaly) at a given instance of equipment, a service ticket manager of the utility server can generate a work order (e.g., service ticket) for a service crew requesting inspection of the given instance of equipment. The service crew can be dispatched to investigate the given instance of equipment to confirm or refute the presence of the defect and (if the defect is confirmed), to remedy the defect. The service crew can generate a service report that can be employed by the defect detector (as feedback) to adjust scaling factors to achieve improve the potential defect (e.g., anomaly) detection rate and accuracy over time due to the nature of operation variation.

The defect detector can also execute a pattern-matching scheme to match a measured KPI of an instance of individual equipment that has been identified as having a potential defect with instructions for remedying the defect. The instructions can be included with the work order to assist the service crew in remedying a defect. Moreover, the service report can be employed as feedback to improve the accuracy of the pattern-matching scheme.

By employment of the systems and methods described herein, potential defects in the power provider with multiple power sources operating in parallel can be detected accurately and efficiently. Thus, the systems and methods can reduce downtime of the power provider. Moreover, false positives are reduced, thereby allowing for more efficient deployment of service crews.

FIG. 1 illustrates an example of an electric power distribution system 50 that detect potential defects (anomalies) occurring in a power provider 52 (e.g., a power plant). The power provider 52 can provide electric power to components of a power grid 54 (e.g., transmission lines, substations, consumer premises, etc.). The power provider 52 could be, for example, a photovoltaic system, a thermal solar field a wind farm (e.g., wind turbines), a battery array etc.

The power provider 52 includes L number of sets 56 of power sources 58 operating in parallel, where L is an integer greater than one. Each of the power sources 58 in each of the L number of sets 56 can be implemented as different instances of the same power module. For instance, each power source 58 could be a photovoltaic module, a thermal solar module, battery or a wind turbine depending on the type of power supplier 52. Moreover, each of the power sources 58 can be configured to provide the same output (e.g., electrical current) in response to the same stimuli (e.g., solar irradiance, wind, input current, etc.). That is, each of the power sources 58 are different instances of the same electrical equipment that are operating in parallel.

Each of the L number of sets 56 of power sources 58 can include the same or different numbers of power sources 58. In the example illustrated, the first set 56 (set 1) includes V number of power sources 58, and a last set (set L) includes W number of power sources 58, wherein V and W are each integers greater than or equal to one.

The power supplier 52 can include a data monitor 60. The data monitor 60 receives measurement data from each of the L number of sets 56 of power sources 58, wherein the measurement data characterizes an operational performance of each of the L number of sets 56 of power sources 58. As some examples, the measurement data can include a Key Performance Indicator (KPI), such as a measured output current, voltage, power output, vibration, sound amplitude, wind speed, pressure, flow rate and/or a heat sink temperature associated with each of the L number of sets 56 of power sources 58. It is noted that in some examples, there may be multiple data monitors 60, such as a data monitor 60 assigned to each of the L number of sets 56 of power sources 58.

The data monitor 60 can be representative of a computing device (e.g., a microcontroller) that can communicate on a utility network 62. The utility network 62 can be a mesh network, such as an Internet Protocol version 6 (IPv6) network.

The electric power distribution system 50 can also include a utility server 62. The utility server 62 can be representative of a plurality of servers (e.g., a server farm) executing application software implemented to facilitate operations of a utility provider (e.g., a power company). The plurality of servers represented by the utility server 62 could be local computer devices (e.g., server blades) operating at a single premises and/or distributed across multiple facilities, such as in a computing cloud.

The utility server 62 can include a defect detector 64 (anomaly detector) that receives measurement data from the data monitor 60 via the utility network 70. The utility server 62 can also include a graphical user interface (GUI) 66 that operates as a front end of the utility server 62. In some examples, the GUI 66 can communicate with a client (e.g., a web browser or proprietary application) executing on an external system. In other examples, the GUI 66 can represent a locally operating GUI.

The GUI 66 can allow a user to request generation of a report (e.g., an operational report) for the power provider 52. In particular, the user can employ the GUI 66 to set a timeframe (period) for the report and/or set the criteria for the report. The criteria can include, for example, variances (e.g., in percentage) in measured data (parameters) that are indicative of a defect (anomaly) in the components of the power supplier 54. For instance, the criteria can include a maximum allowable variance of current, voltage, power output, vibration, sound amplitude, wind speed, pressure, flow rate and/or temperature.

The GUI 66 can provide a report request to the defect detector 64. The defect detector 64 can employ statistical analysis on the measurement data received from the data monitor 60 to generate the requested report. The statistical analysis can be employed to determine if the operational performance (characterized in the measurement data) indicates that a given set 56 of the power sources 58 is operating as statistical outliers, which may be indicative of a defect (anomaly). In particular, the defect detector 64 can include a module that determines a Z-score for each set 56 of power sources 58. Each Z-score characterizes the performance of each set 56 of the power sources 58 over the timeframe defined in the report request relative to a mean of the operational performance of the population (e.g., all of the sets) of the sets 56 of the power sources 58.

Additionally, the defect detector 64 can include a module that determines normalized distribution for each set 56 of power sources 58. Each normalized distribution characterizes the performance of each set 56 of the power sources 58 over the timeframe defined in the report request relative to an interquartile range (IQR) of the operational performance of the population of the sets 56 of the power sources 58.

Further, the defect detector 64 can include a module that determines a Mahalanobis distance for each set 56 of power sources 58. Each Mahalanobis distance characterizes the performance of each set 56 of the power sources 58 over the timeframe defined in the report request relative to a mean of the operational performance of the population (e.g., all of the sets) of the sets 56 of the power sources 58. Moreover, as explained in detail with respect to FIG. 2, the Mahalanobis distance evaluates a plurality of parameters concurrently.

The defect detector 64 can aggregate the results of the statistical analyzes to determine (at least) a list of sets 56 of the power sources 58 that may have a defect, which can be referred to as a defect list. Additionally, the defect detector 64 may match one more of the lists 56 of the power sources 58 with instruction that may possibly remedy the defect (if present). The defect list can be included in a report generated in response to the report request provided by the GUI 66.

The GUI 66 can output the report to the user. The output report identifies (among other things) a list of sets 56 of the power sources 58 that need investigating. The user can employ the GUI 66 to generate an investigation request of each of the sets 56 identified in the report that may have a defect. The investigation request can be provided to a service ticket manager 68. The service ticket manager 68 can generate and send a work order to a mobile computing device for a service crew 72 that identifies the sets 56 of the power sources 58 that need investigation. The work order can be transmitted via a secure network 74 (e.g., which secure network 74 may or may not be coupled to the Internet).

As used herein, the term "service crew" denotes machinery, tools and/or human resources needed to resolve issues throughout the electric power distribution system 50. A service crew 72 can include a vehicle, and a transceiver (e.g., the mobile computing device or a radio) for two-way communication with the utility server 62.

Upon arrival at the physical location of the power provider 52, the service crew 72 can evaluate (e.g., directly measure) each set 56 of the power sources 58 to confirm or refute a defect. Upon confirmation of a defect, the service crew 72 can take corrective action (e.g., repair and/or replace components of the power provider 52, such as one or more power sources 58) to remedy the situation and record the corrective action taken in a service report. Additionally, in situations where a defect is refuted (e.g., confirmation that a particular set 56 of power sources 58 is operating properly), the service crew 72 can record these findings in the service report.

The service crew 72 can provide the service report to the service ticket manager 68. The service ticket manager 68 can forward the service report to the defect detector 64. The defect detector 64 can employ the service report to update scaling factors and/or pattern matching to improve the accuracy of future reports.

By employment of the power distribution system 50, potential defects (anomalies) in the power provider 52 can be efficiently detected. In particular, by employing statistical analysis on the measurement data provided for the sets 56 of the power sources 58, a direct comparison of real-time operation of the power sources 58 can be executed. Moreover, the statistical analysis executed by the defect detector 64 can uncover latent defects that may be difficult or nearly impossible to detect with conventional methods.

Figure 2:
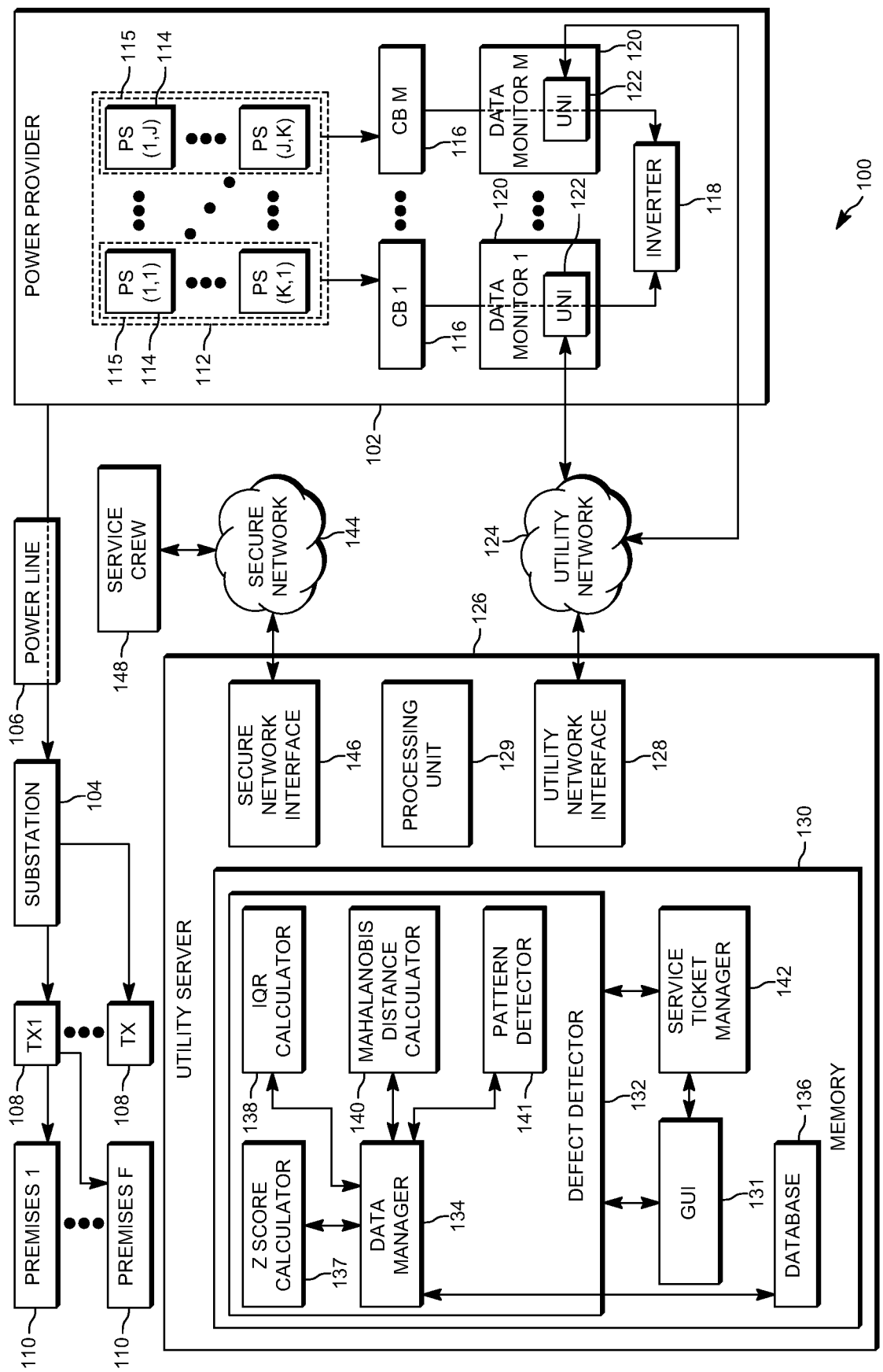
FIG. 2 illustrates another example of a power distribution system that detects potential defects in a power provider.

FIG. 2 illustrates another example of a power distribution system 100 that can detect anomalies in a power supplier 102. The power supplier 102 can provide electrical power. In some examples, the power supplier 102 can generate electric power, and in other examples, the power supplier 102 can supply stored electrical power. The power supplier 102 could be implemented as a power plant, such as a wind farm, a solar system, a thermal solar field and attendant constituent structures or any combination thereof. Alternatively, the power supplier 102 could be implemented as a stored power system (e.g., a battery system). The power source 102 can transmit a high-voltage, alternating current (AC) power signal (such as a 115 or 220 kilovolt (kV) AC power signal) to a substation 104 via a power line 106 (e.g., a transmission line).

The substation 104 can transform the high voltage AC power signal into a mid-voltage power signal. For example, it may be desirable in some circumstances to step down (or to step up) voltage via one or more substation 104 electrical components, to phase-shift and/or otherwise to adjust current phase or amplitude, for instance, to achieve a desired power function as specified by the kind of load and/or to minimize energy lost in the power distribution system 100. As one example, the substation 104 may include electrical components (transformers) for transforming and conditioning a 115 kV AC signal into 41.6 and/or 12.47 kV AC signal. In another example, the substation 104 may include electrical components for transforming and conditioning a 220 kV AC signal into a 66 kV AC signal. It is to be appreciated that in yet other examples, different input and output voltages could be implemented. It is noted that the power distribution system 100 may include more than one power supplier 102 and/or more than one substation 104. The substation 104 can distribute electric power signals to D number of transformers 108 (labeled as $Tx_1 \ldots Tx_D$), where D is an integer greater than one.

Each of the D number of transformers 108 can transform the mid-voltage power signal into a low-voltage consumer power signal, such as a 110-220 V AC power signal that are transmitted a corresponding F number of premises 110 (e.g., domiciles, office buildings or industrial complexes), where F is an integer greater than one. The premises 110 can also be referred to as customer premises. For purposes of simplification of explanation, only one transformer 108 (TO is illustrated as being connected to the F number of premises 110, but it is to be understood that each transformer 108 is connected to a set of the F number of premises 110.

The power supplier 102 includes a J×K array 112 of power sources (PS) 114 operating in parallel, where J and K are each integers greater than one. Accordingly, each power source 114 can be uniquely identified by a row and column. For instance, PS (1,1) denotes the instance of the power source 114 at row 1, column 1. Similarly, PS (J,K) denotes the instance of the power source 114 at row J, column K. In other examples, other identifiers can be used for the array 112. Additionally, in other examples, the array 112 can have more or less than two dimensions. Moreover, for purposes of simplification of explanation, the array 112 illustrates each row and column as having the same number of instances of the power source 114 (J×K elements). However, in some examples, there may be a different number of instances of power source 114 in each row or column.

As used herein, the phrase "operating in parallel" indicates that each instance of the power source 114 receives substantially the same stimulus and is configured to provide substantially the same output. As a first extended example (hereinafter, "the first example"), the array 112 could represent a solar array. In such a situation, each instance of the power source 114 can be representative of a photovoltaic module that outputs substantially the same current in response to substantially the same irradiance. In a second extended example (hereinafter, "the second example"), the array 112 could represent a wind farm. In such a situation, each instance of the power source 114 could be representative of a wind turbine that outputs substantially the same current in response to substantially the same wind speed.

In some situations, a set (a group) of the instances of power source 114 can be coupled together in series to form a string of power sources, which is referred to as a string. For instance, in the first example, a string of photovoltaic modules can correspond to a column of instances of power source 114 (e.g., PE(1,1) . . . P(K,1)). In other examples, other groupings can be employed in each string 115.

Each string 115 (set) can be arranged to provide electrical current to one of M number of combiners 116, where M is an integer greater than or equal to one. The M number of combiners 116 can be representative of multiple combiners and/or a hierarchy of combiners. Moreover, in some examples, multiple strings 115 can be coupled to the same combiner 116. For instance, in the first example, a set of strings 115 (e.g., 2-10) can be coupled to a string combiner, which can be represented by the combiner 116. Additionally, a set of combiners 116 (e.g., 2-10) can be coupled to a combiner box, which can also be represented by the M number of combiners 116.

Each of the M number of combiners 116 can be coupled to an input of an inverter 118 (a power inverter) that can convert direct current (DC) power into alternating current (AC) power for transmission of electricity to the power line 106. Additionally, for purposes of simplification of explanation, in FIG. 2, only one inverter 118 is illustrated. However, in other examples, more than one inverter 118 may be employed. Each respective data monitor 120 of M number of data monitors 120 can be coupled to each input of the inverter 118. Each data monitor 120 can be a computing device, such as a microcontroller.

Each data monitor 120 can include circuitry and/or machine readable instructions to passively detect properties of a power signal input into the inverter 118. For instance, each data monitor 120 can include a current transducer (a current sensor) that measures a current of the signal input into the inverter 118. Additionally, the data monitor 120 can measure other parameters of the power signal as well. For instance, in some examples, the data monitor 120 can measure a voltage of the power signal, a power output, an amount of noise on the power signal, etc.

Furthermore, in some examples, each data monitor 120 can include a temperature sensor that can measure a temperature of a heat sink in a combiner 116. For instance, in the first example, each of the M number of data monitors 120 (or some subset thereof) can be positioned inside a combiner box (represented by the M number of combiners 116). In this situation, as explained herein, excessive heat on a heat sink may affect operation of the power source 102.

Each data monitor 120 can include a utility network interface 122. The utility network interface 122 could be a wireless or wired network interface card configured to communicate on a utility network 124. The utility network 124 could be a mesh network, such as an Internet Protocol version 6 (IPv6) network.

A utility server 126 (e.g., a computer system) can also be connected to the utility network 124 via a utility network interface 128 (e.g., a network interface card). The utility server 126 can be implemented by a utility provider (e.g., a power provider), such as a utility provider that controls the power supplier 102. The utility server 126 can include memory 130 to store machine executable instructions. The memory 130 can be implemented as a non-transitory machine readable medium. The memory 130 could be volatile memory (e.g., random access memory), non-volatile memory (e.g., a hard drive, a solid state drive, flash memory, etc.) or a combination thereof. The utility server 126 can include a processing unit 129 (e.g., one or more processor cores) that accesses the memory 130 and executes the machine readable instructions.

In some examples, the utility server 126 can be (physically) implemented at facilitates controlled by the utility provider. In such a situation, the utility server 126 could be representative of multiple servers (e.g., a server farm). Additionally or alternatively, the utility server 126 (or a portion thereof) can be implemented in a remote computing system, such as a computing cloud. In such a situation, features of the utility server 126, such as the processing unit 129, the network interface 128 and the memory 130 could be representative of a single instance of hardware or multiple instances of hardware with applications executing across the multiple of instances (i.e., distributed) of hardware (e.g., computers, routers, memory, processors, or a combination thereof). Alternatively, the utility server 126 could be implemented on a single dedicated computing device.

The utility network 124 can, in some examples, be implemented on (e.g., connected to) a public network, such as the Internet, a private network (e.g., a proprietary network) or a combination thereof (e.g., a virtual private network). In this manner, the utility server 126 can establish bi-directional communication with each of the M number of data monitors 120 (or some subset thereof) via the utility network 124.

The memory 130 can store application software for controlling operations of the utility provider. For example, the memory 130 can store application software for processing and billing systems, various monitoring, customer service, troubleshooting, maintenance, load balancing, accounting and other types of activities that may be used to operate a utility provider.

The memory 130 can include a graphical user interface (GUI) 131 that can operate as a front end for an defect detector 132 that implements analytics to detect potentially anomalous behavior of instances of the power source 114 based on data received from each of the M number of data monitors 120. The GUI 131 can be representative of a local user interface and/or a remote interface that communicates with an external client (e.g., a web browser or proprietary application). The GUI 131 can provide an interface for generating reports and setting criteria for determining whether a potential anomaly exists.

Figure 3:
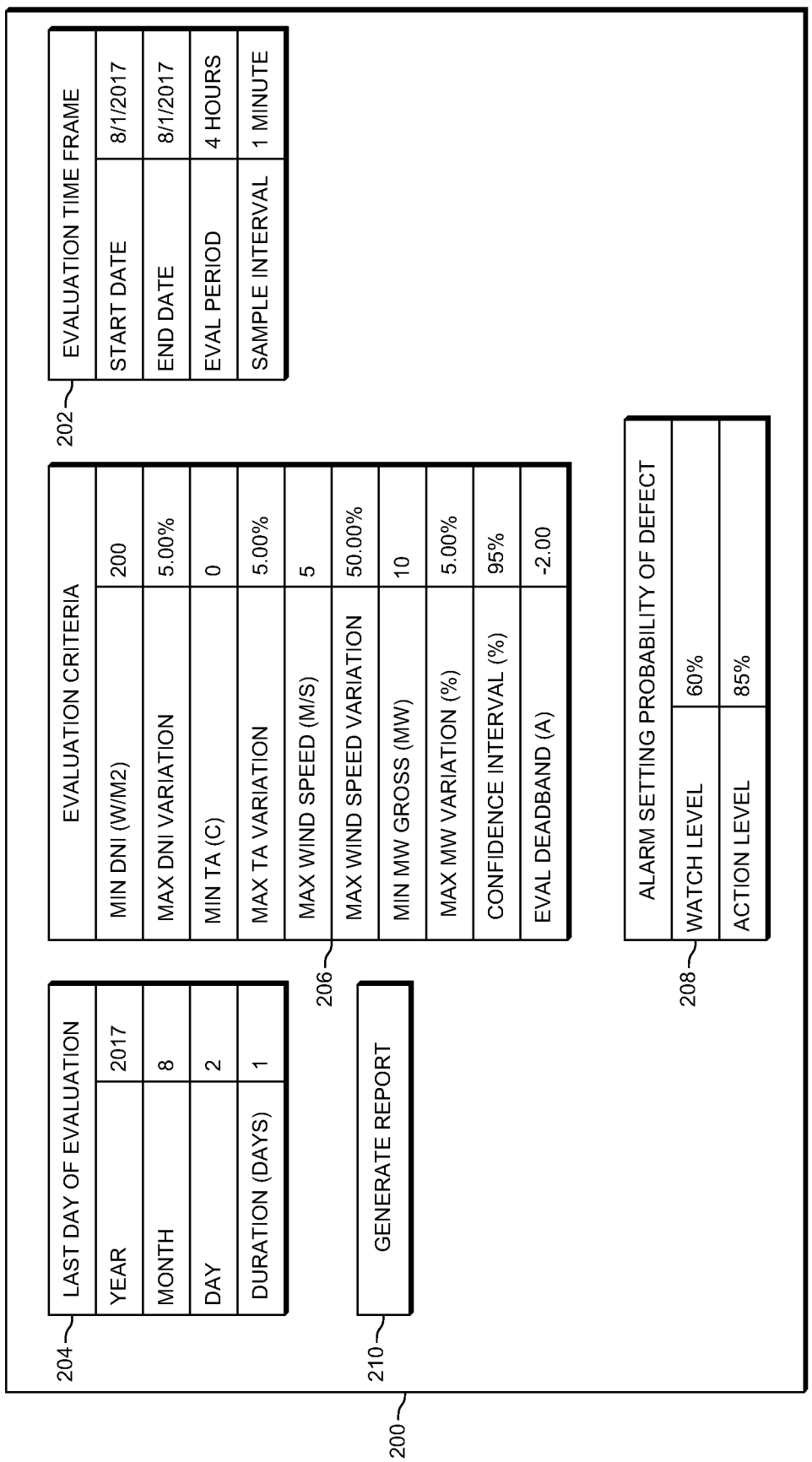
FIG. 3 illustrates a screenshot of a graphical user interface for requesting a report for the operational performance of a power provider.

FIG. 3 illustrates an example of a screenshot 200 that could be provided by the GUI 131 to request generation of a report that identifies combiners 116 with a potential defect operating in a solar system. However, the GUI 131 could be adapted to other types of power providers as well. As illustrated, the screenshot 200 includes an evaluation timeframe table 202 (e.g., date and length of time) for a profile being evaluated. As illustrated the evaluation time frame table allows the user to control a start date, and end date, an evaluation period and an evaluation interval (e.g., once per minute, once per 5 minutes, once per hour, etc.) that data is to be analyzed to determine whether a potential defect (anomaly) exists. In some examples, a last day of evaluation table 204 can be populated by the user to define the evaluation timeframe. Furthermore, the screenshot 200 includes an evaluation criteria table 206 that can allow a user to set variance criteria that can define threshold levels for determining whether an anomaly exists. The variance criteria can change based on the type of power sources (e.g., the power sources 114 of FIG. 1) being evaluated. Further, the screenshot 200 includes an alarm setting table 208 that defines a probability that a defect (anomaly) has occurred. Moreover, the alarm setting table 208 includes two levels, a watch level alarm and an action level alarm, but in other examples more or less levels could be employed.

Upon selected the desired criteria, the user can actuate a report button 210 that causes the GUI 131 to send a request for a report based on the information in the evaluation time frame table 202, the evaluation criteria 206 and the alarm setting table 208.

Referring back to FIG. 2, the defect detector 132 can include a data manager 134 that receives the report request. Additionally, the defect detector receives measured data from each of the M number of data monitors 120. The data can be provided periodically (e.g., once per minute, once per hour, etc.) and/or asynchronously (e.g., in response to a request from the defect detector 132). The data manager 134 can store the received data from each of the M number of data monitors 120 in a corresponding record of a database 136. Additionally, in each record of the database 136 can include a scaling factor for the normalization of data. For instance, in the first example, a first combiner 116 may receive current from 3 strings 115 that each have 9 photovoltaic modules and a second combiner 116 may receive current from 3 strings 115 that each have 18 photovoltaic modules. In this situation, the record associated with the first combiner 116 may have a scaling factor of '2', and the second combiner 116 may have a scaling factor of '1'. Additionally, each record in the database 136 can uniquely identify a set of strings 115 that are associated with the measured data. In this manner, upon detecting a potential defect (in a manner described herein), the data manager 134 can also identify the particular set of strings 115 and/or combiner 116 in which the potential defect (anomaly) is detected.

The data detector 116 can collect the data from the M number of data monitors 120 in a given operational profile, and the data can be stored in the database 136 as historical data. Moreover, the defect detector 132 can be configured to identify potential defects in a timeframe defined by the report request (e.g., once per day). An operational profile (corresponding to a timeframe characterizes a set of environmental conditions during which each instance of the power source 114 should be operating at a particular level of performance (e.g., peak performance or near peak performance). In the first example, the operational profile can correspond to a period of time where weather data received from an external source indicates that the array 112 (a solar array) is exposed to bright sunlight (at a specific irradiance) with relatively little overcast (cloud coverage). Conversely, in the second example, the operational profile may correspond to a period of time where the weather data indicates that the array 112 is exposed to a specific, and relatively constant wind speed.

The data manager 134 can collect data points (measured data from the M number of data monitors 120) during the operation in a given operational profile (or multiple profiles) and store the collected data points in the database 136 to form a profile population. The defect detector 132 can employ a plurality of statistical analyses to identify potential defects (anomalies) in a key performance indicator (KPI) that includes one or more parameters included in the data received from the M number of data monitors 120. The statistical analysis can be employed to determine if the operational performance (characterized in measurement data provided from the M number of data monitors 120) indicates that a given string 115 is operating as a statistical outlier, which may be indicative of a defect (anomaly).

In particular, the defect detector 132 can include a Z-score calculator 137 that can calculate a Z-score for a parameter associated with each combiner 116. The Z-score calculator 137 can calculate a mean (arithmetic mean or centroid) of the parameter of the profile population for each moment in time that data is provided from the M number of data monitors 120 (or some subset thereof) for the timeframe (which may be defined by the report request). For instance, the Z-score calculator 137 can calculate the arithmetic mean at specific intervals recorded in the profile population (e.g., once per minute, once per 5 minutes, once per hour, etc.). Additionally, the Z-score calculator 137 can calculate a standard deviation, a for each calculated mean of the profile population. In the first and second examples, the parameter could be an output current, a voltage or temperature.

The Z-score calculator 137 can also calculate a Z-score of the parameter for each of the M number of combiners 116 at each time interval. In particular, Equation 1 provides a calculation for determining the Z-score of the parameter at each interval for which the mean of the profile population is calculated, or some subset thereof.

$$Z = \frac{X - \mu}{\sigma} \quad \text{Equation 1}$$

Wherein:
Z is the Z-score of the parameter at a given time interval;
X is the value of the parameter for a given combiner at the given time interval;

μ is the mean for the parameter for the parameter of the profile population at a given time interval; and σ is the standard deviation of the parameter of the profile population at the given time interval.

Additionally, the Z-score calculator 137 can calculate a mean (arithmetic mean or centroid) of the Z-scores for each individual combiner 116 of the M number of combiners 116 for the given time period characterized in the profile population. That is, the Z-score calculator 137 can calculate the mean of the Z-scores for the parameter (e.g., the current) over the given time period for each individual combiner 116 to determine a mean Z-score.

The Z-score calculator 137 can employ a Z table to determine a probability of a potential defect (anomaly) based on the mean Z-score for each of the M number of combiners 116 to determine which mean score (if any) meets the watch level and/or the action level defined in the report request. For instance, if one or more of the combiners 116 has a mean Z-score that is greater or equal to about 3 or is less than about −3, the one or more combiners 116 are determined to deviate from 99% of the rest of the profile population. Accordingly, it can be determined that there is about a 95% chance that a defect is present at the given combiner 116 and/or upstream from the given combiner 116 (e.g., at one or more of the power sources 114 and/or interconnecting wiring). The Z-score calculator 137 can provide a list of the M number of combiners 116 and the associated mean Z-scores, that include (as part of the list) the list of the M number of combiners that are determined to meet the watch level and/or the action level defined in the report request to the data manager 134.

In some instances, due to non-normal distributions of data in the profile population (commonly referred to as "spikey data"), the Z-score calculator 137 may not detect a potential defect of a given combiner 116. Accordingly, the defect detector 138 also includes an interquartile range (IQR) calculator 138 to further increase accuracy that operates in parallel (concurrently) with the Z-score calculator 137.

The IQR calculator 138 can calculate a median value of the parameter for each time interval in the profile population (or some subset thereof). Additionally, the IQR calculator 138 can calculate an IQR (midspread or middle 50%) of the profile population for each median value calculated. That is, for each median value of the parameter for each value calculated, the IQR calculator 138 can determine a range that represents 50% of the total profile population at a corresponding interval. Equation 2 defines the profile population at each interval.

$$IQR = Q_3 - Q_1 \quad \text{Equation 2:}$$

Wherein:

$Q_1$ is the first quartile, which is the value of the parameter at the $25^{th}$ percentile at a given time interval; and $Q_3$ is the third quartile, which is the value of the parameter at the $75^{th}$ percentile at the given time interval.

The IQR calculator 138 can also calculate a normalized distribution of the parameter for each of the M number of combiners 116 at each of the time intervals. In particular Equation 3 provides a calculation for determine the normalized distribution of the parameter at each interval for which the median of the profile population is calculated, or some subset thereof.

$$ND = \frac{X - \tilde{Y}}{IQR} \quad \text{Equation 3}$$

Wherein:

ND is the normalized distribution (e.g., "IQR score") of the parameter of a given combiner for a given time interval;

X is the value of the parameter for the given combiner at the given time interval; and $\tilde{Y}$ is the calculated median for the profile population at a given time interval.

Additionally, the IQR calculator 138 can calculate a median of the normalized distribution for each individual combiner 116 of the M number of combiners 116 for the given time period (e.g., the entire timeframe or some subset thereof) characterized in the profile population. That is, the IQR calculator 138 can calculate the median of the normalized distribution for the parameter (e.g., the current) over the given time period for each individual combiner 116.

The IQR calculator 138 can detect a potential defect based on each median normalized distribution for a given combiner 116 based on the watch level and the action level defined in the report request from the GUI 131. For instance, if one or more of the combiners 116 has a median normalized distribution that is greater or equal to about 1.75 or is less than about −1.75, the one or more combiners 116 are determined to deviate from 99% of the rest of the profile population. Accordingly, it can be determined that there is about a 95% chance that a defect is present at the one or more combiners 116 and/or upstream from the one or more combiners (e.g., at one or more of the power sources 114 and/or the interconnection wiring). The IQR calculator 138 can provide a list of the M number of combiners 116 and the associated median normalized distributions, that includes the list of the M number of combiners 116 that are determined to meet the watch level and/or the action level defined in the report request to the data manager 134.

Additionally, in some examples, the defect detector 132 can include a Mahalanobis distance calculator 140 that can operate in parallel (e.g., concurrently with) the Z-score calculator 137 and the IQR calculator 138. The Mahalanobis distance calculator 140 can be employed to detect a potential anomaly based on N number of parameters, where N is an integer greater than or equal to 2. As some examples, the parameters could be current, voltage, power, vibration, sound amplitude, wind speed, pressure, flow rate, temperature or any combination thereof. In some situations described herein, it is presumed that only 2 parameters are employed (e.g., current and temperature), but it is to be understood that in other examples, the Mahalanobis distance calculator 140 can detect a potential defect (anomaly) based on 3 or more parameters.

The Mahalanobis distance calculator 140 can calculate a covariance matrix, S for each time interval in the profile population (or some subset thereof). The covariance matrix, S characterizes a covariance weighted distance measure, making it possible to distort a feature space defining each point, which allows for improved discrimination among the various characters. The covariance matrix, S can be calculated with Equations 4-6.

$$S = \frac{1}{M} \Sigma_{i=1}^{M} (x_i - \mu)(x_i - \mu)^T \quad \text{Equation 4}$$

$$x_i = \begin{bmatrix} x_1 \\ \vdots \\ x_N \end{bmatrix} \quad \text{Equation 5}$$

$$\mu = \begin{bmatrix} \mu_1 \\ \vdots \\ \mu_N \end{bmatrix} \qquad \text{Equation 6}$$

Wherein:

$x_1 \ldots x_N$ are the values of each of the N parameters for a given combiner of the M number of combiners (samples) for a given time interval; and $\mu_1 \ldots \mu_N$ are the mean values of each of the N parameters for the M number of combiners for the given time interval.

Upon calculating the covariance matrix, S, the Mahalanobis distance calculator 140 can calculate a Mahalanobis distance for each of the M number of combiners 116 using Equation 7.

$$D_M(x_i) = \sqrt{(x_i - \mu) S^{-1} (x_i - \mu)^T} \qquad \text{Equation 7:}$$

Wherein:

$D_M(x_i)$ is the Mahalanobis distance for the given combiner (sample).

Thus, for each time interval in the timeframe characterized in the profile population, the Mahalanobis distance calculator 140 can calculate the Mahalanobis distance for each of the M number of combiners 116. Furthermore, the Mahalanobis distance calculator 140 can calculate a mean Mahalanobis distance for each of the M number of combiners 116.

The Mahalanobis distance calculator 140 can detect a potential defect (anomaly) based on each mean Mahalanobis distance for each of the M number of combiners 116 as well as the watch level and action level included in the report request. For instance, to determine a 5% defect level (indicating that there is about a 95% chance of a defect), the Mahalanobis distance calculator 140 can employ a Chi-square ($\chi^2$) table to determine a threshold of the Mahalanobis distance. Depending on the number of dimensions (parameters) being used for the covariance matrix calculation, the threshold varies. In an example where 2 dimensions (parameters) are employed (e.g. current and temperature), the square of the Mahalanobis distance shall be larger than about 5.99 for a defect that deviates from 95% of the rest of the profile population. That is, a Mahalanobis distance larger than about 2.45, which is about the square root of 5.99, indicates that there is a 95% chance of a defect. Accordingly, it can be determined that there is about a 95% chance that a defect is present at the given combiner 116 and/or upstream from the given combiner (e.g., at one or more of the power sources 114). The Mahalanobis distance calculator 140 can provide a list of the M number of combiners 116 and the associated mean Mahalanobis distance that includes the list of the M number of combiners 116 that are determined to meet the watch level and/or the action level defined in the report request to the data manager 134.

The potential defects detected by the Mahalanobis distance calculator 140 may not be detected by multiple instances of a single parameter analysis (such as the Z-score or normalized distribution, as described herein). For instance, in a situation where the two parameters evaluated in the Mahalanobis distance correspond to a current and temperature, the Mahalanobis distance calculator 140 can detect potential defect (anomaly) where neither the current nor the temperature individually exceeds a threshold. However, in this situation, due to the covariance between the current and temperature, the Mahalanobis distance calculator 140 may detect a potential defect (anomaly) when the current and temperature are evaluated together.

The data manager 134 can parse the lists of the M number of combiners 116 that meet the watch level and/or action level of the report request provided from each of the Z-score calculator 137, the IQR calculator 138 and the Mahalanobis distance calculator 140. The data manager 134 can aggregate the lists to form an aggregated score list. In some examples, the aggregated score list can include an aggregated (mean value) defect percentage chance based on the mean Z-score, the median normalized distribution and the mean Mahalanobis distance calculated for each of the M number of combiners 116, as well as a deviation (e.g., maximum and minimum) of the defect percentage chance. The aggregated score list includes a potential anomaly list may include any of the M number of combiners 116 that are present on any of the list of M number of combiners with a potential anomaly returned by the Z-score calculator 137, the IQR calculator 138 and/or the Mahalanobis distance calculator 140. Moreover, the aggregated score list can include data that uniquely identifies each of the M number of combiners 116 on the list, as well as the potential type of defect (e.g., identification of which parameter(s) may be operating at an outlier level). The aggregated score list can be stored in the database 136.

Additionally, the data manager 134 can send data for each combiner 116 in the potential defect list to a pattern detector 141. The data can include, for example, the mean Z-score, the median normalized distribution and the Mahalanobis distance for each combiner 116 in the potential anomaly list (or some subset thereof) and/or measured data (parameters) for each combiners 116 identified in the potential defect list. The pattern detector 141 can analyze the data associated with each such combiner 116 to determine if the data matches a stored pattern. In some situations, the stored pattern can include instructions for a potential remedy to a defect. The pattern detector 141 can return the list of instructions for each matched pattern to the data manager.

The data manager 134 can generate a report for the GUI 131 as a response to the report request. The report can include data that uniquely identifies the combiner 116 for which a potential defect (anomaly) is detected, as well as the level (in percentage) of the detected potential defect (e.g., watch level or action level). Additionally, in situations where a pattern was found, the report can include a list of instructions for a potential remedy to a potential defect.

Figure 4:
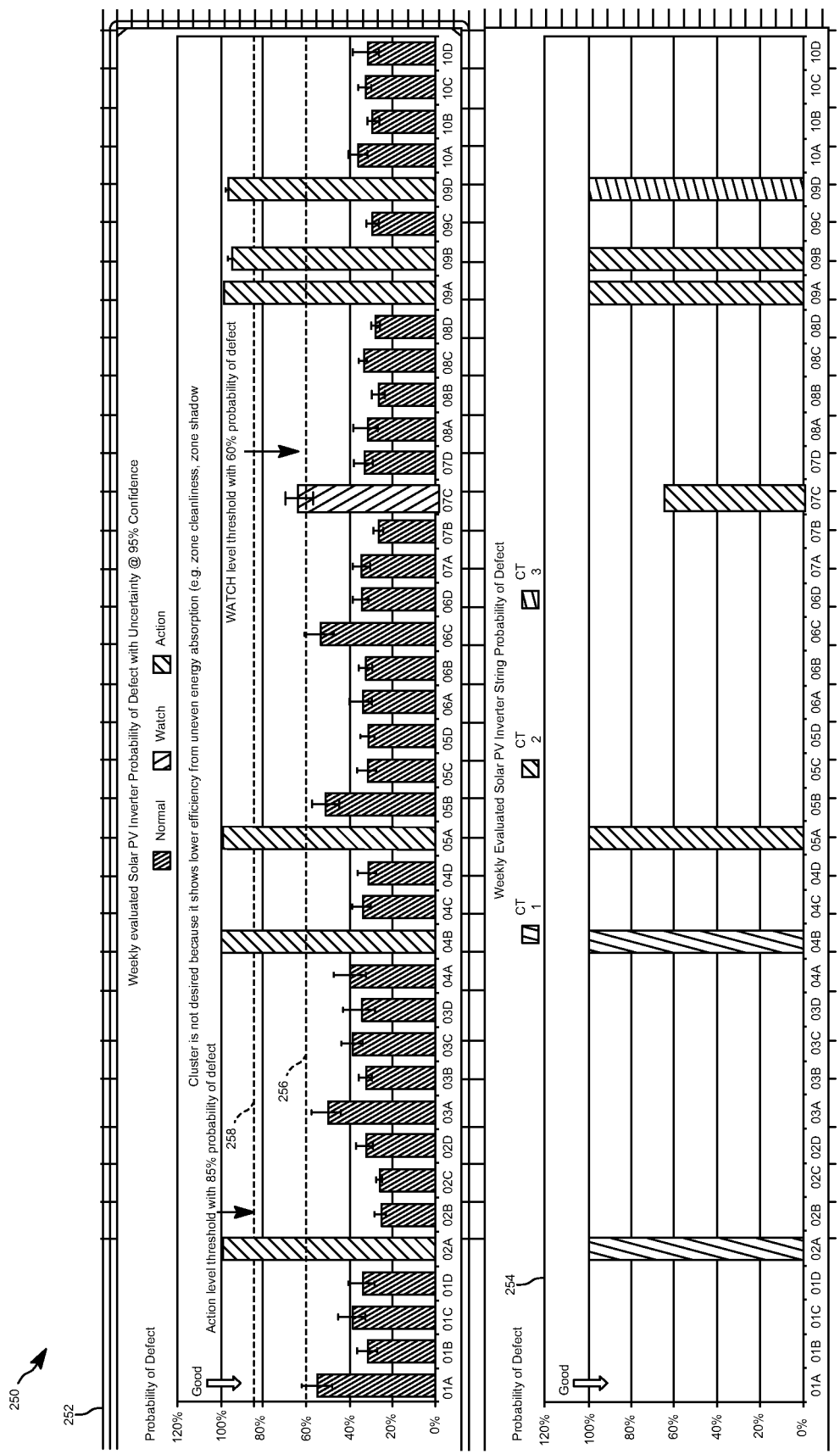
FIG. 4 illustrates a screenshot of an output of a report characterizing the operational performance of a power provider.

FIG. 4 illustrates an example of a screenshot 250 that outputs two versions of a report, namely, a first report 252 and a second report 254. The first report 252 includes a bar graph that lists of the M number of combiners 116 (or some subset thereof) along with a percentage of a probability of defect as well as a variance in the percentage of a probability of defect. In the first report 252 and the second report 254, each combiner is identified with a unique identifier ("01A" . . . "10D"). As illustrated, a watch line 256 (a dashed) representing the watch level and an action line 258 (another dashed line) representing the action level are included. The second report 254 includes a bar graph depicting bars for the set of combiners 116 that have a likelihood of a defect that exceeds the watch level and/or the action level and omits bars for other combiners 116 (operating in the acceptable/good range).

Referring back to FIG. 2, the user of the GUI 131 can evaluate the report provided by the data manager to select an appropriate course of action. In particular, the GUI 131 can include a feature (e.g., virtual buttons and/or data fields) that allow the user to interact with a service ticket manager 142. The user can employ the GUI 131 to select a given set of combiners 116 (of the M number of combiners 116) that are to be inspected/evaluated on a next scheduled maintenance visit to the power supplier 102 for potential defects. In other examples, this scheduling can occur automatically (e.g., without user input). The given set of combiners 116 could be combiners 116 that have a probability of defect above the watch level, but below the action level (e.g., the combiner "07C" of FIG. 4). Additionally or alternatively, the user can employ the GUI 131 to select another set of combiners 116 (of the M number of combiners 116) that are to be evaluated as soon as possible (e.g., the combiners "02A", "04B", "05A", "09A", "09B" and "09D") which may need unscheduled maintenance. The other set of combiners 116 could be the combiners that have a probability of defect that is above the action level.

The service ticket manager 142 can schedule maintenance of the power supplier 102. In particular, the service ticket manager 142 can communicate on a secure network 144 via a secure network interface 146. The secure network 144 can be a private network, a public network, such as the Intranet or a combination thereof (e.g., a virtual private network). Additionally, a service crew 148 can communicate with the service ticket manager 142 via the secure network 144. The service crew 148 (that includes one more repair technicians) may visit the physical site of the power provider 102.

Based on the request provided from the GUI 131, the service ticket manager 142 can provide a work order to a mobile device associated with the service crew 148. The work order can include a list of combiners 116 that need evaluated/inspected. The list of combiners 116 that are in the work order can be the list of combiners 116 that have been identified as being on the watch list and/or the action list. Additionally, in some situations, the work order can include instructions (included in the report provided to the GUI 131) that may assist the service crew 148 in remedying the potential defect. Upon arrival at the power provider 102, the service crew can inspect and/or repair each of the combiners 116 on the work order to determine what (if any) action should be taken.

For instance, in the first example, the service crew can measure an input current of each string 115 provided to a given combiner 116 identified in the work order. If one or more of the strings 115 reports a relatively low input current the given combiner 116, each individual power source 114 of the one or more strings 115 may be evaluated. If one or more of the power sources 114 is detected to be faulty, that power source 114 (e.g., a photovoltaic module) may be replaced.

Furthermore, it is possible that upon inspecting of the given combiner 116, no repair/service is needed. For instance, in some situations of the first example, it may be discovered that a particular string attached to the given combiner 116 is in natural shade. Additionally, in the second example, it may be discovered that a given windmill (corresponding to a power source 114) is positioned in a place with relatively low wind (e.g., behind a natural obstruction). The service crew 148 can employ the mobile device to generate a service report for the work order.

The service report can include information characterizing work performed on each of the combiners 116, strings 115 and/or power sources 114 at the power provider 102. Such work can include replacement/repair of equipment, inspection of equipment etc. The service report can be returned to the service ticket manager 142.

The service ticket manager 142 can provide the service report to the defect detector 132, which can use the service report as feedback. In particular, the pattern detector 141 can evaluate the service report to determine if the scaling factor of any of the M number of combiners 116 needs to be adjusted. The scaling factor may need to be adjusted, for instance, in the situation where a combiner 116, a string 115 and/or a power source 114, upon inspection is determined to be operating properly (e.g., in a shaded area of a solar array). Thus, the pattern detector 141 can determine/update the scaling factor for each such combiner 116 identified in the work order. In this manner, the likelihood that the same combiner 116 will erroneously be included on the defect list of the aggregated deviation score for subsequent reports is reduced.

Additionally, the pattern detector 141 can attempt to determine if a corrective action (e.g., lose wiring repair, replacement of power source, etc.) matches a pattern for the detected deviation of one or more parameters (KPIs). For instance, if a given combiner 116 (included in a work order) reports a specific current and/or temperature, and a defect is corrected with a loose wiring repair, the pattern detector 141 can record the repair instructions and the specific set of parameters (KPIs) that were recorded prior to the repair in the database 136. Accordingly, in some examples, upon detecting the same or similar set of parameters for a subsequent report, the data manager 134 access the database to determine if there is a suggested repair instructions for the set of parameters. In this situation, the suggested repair instructions can be output at the GUI 131 and forwarded to the service crew 148 for a subsequent work order in the manner described herein.

As noted, the power distribution system 100 can be employed in nearly any power provider 102 that implements parallel operating power sources 114. Such power providers 102 can include, for example, a solar system, a thermal solar field a wind farm, a battery storage system, etc. In fact, the statistical analysis executed by the utility server 126 can be performed without specialized/proprietary equipment installed at the power provider 102. That is, the power distribution system 100 can be retrofit onto an existing power provider 102 without a substantial interruption in service.

Moreover, by employment of the power distribution system 100, potentially defective (anomalous behavior) components, such as the combiners 116, a string 115 and/or power sources 114 can be detected prior to full operational failure, thereby reducing downtime. Moreover, in contrast to a direct comparison of the outputs of the electrical devices, the multiple types of statistical analysis executed by the defect detector 132 increase the chances of detecting a defect, while decreasing the chances of a "false positive". Moreover, as explained, upon inspecting the power provider 102, in situations where a false positive does occur, the pattern detector 141 can adjust a scaling factor for certain combiners 116, such that further accuracy of faults (anomalies) can be further improved.

Furthermore, as power providers 102 become larger and larger, it becomes less and less feasible to manually measure output of each individual power source 114. For instance, some solar arrays have over 6 million photovoltaic modules (power sources). In such a situation, without employing the power distribution system 100, small defects could potentially exist for several years prior to detection, which defects may result in a loss of power output by the power provider 102. Thus, the power distribution system 100 improves the efficiency in which defects (anomalies) are discovered and corrected.

Figure 5:
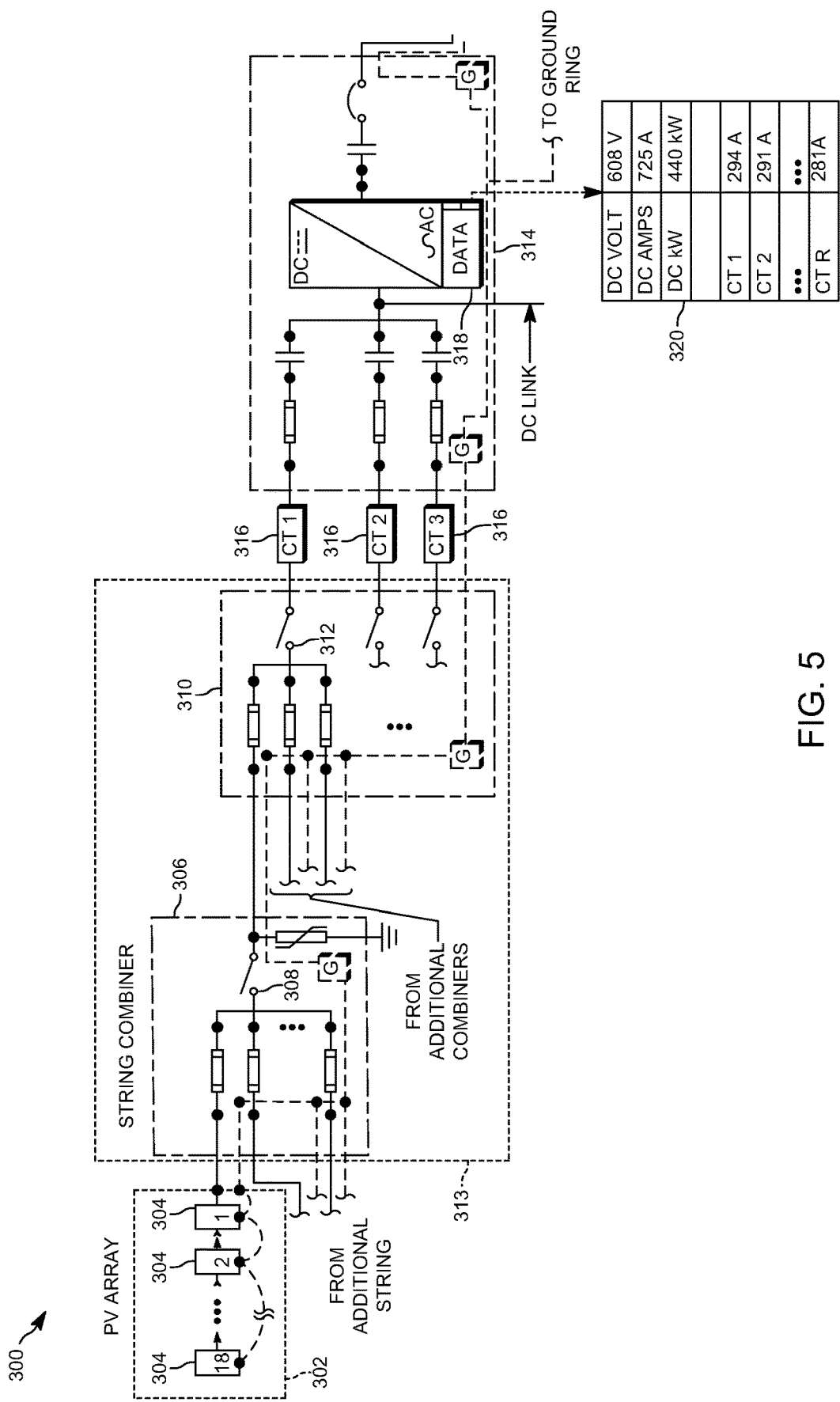
FIG. 5 illustrates an example arrangement of photovoltaic modules for a power provider.

FIG. 5 illustrates an example of an arrangement for a power provider 300 (e.g., a portion of the power provider 102 of FIG. 2) that can be employed in a system (e.g., the power distribution system 100 of FIG. 2) to detect a potential defect (anomaly). The power provider 300 includes B number of strings 302 of photovoltaic modules 304 connected in series, where B is an integer greater than or equal to one. In some examples, each of the B number of strings 302 can have the same number of photovoltaic modules 304 connected in series (e.g., 18). In this situation, each string 302 may be configured to provide a maximum output of about 8 amperes (A) of current. In other examples, each string 302 can have a different number of photovoltaic modules 304.

A set of strings 302 can be coupled to an input of a string combiner 306. In some examples, 3 strings 302 can be coupled to a common output node 308 of the string combiner 306. In other examples, there can be more or less strings 302 in the set of strings 302. Additionally, a set of string combiners 306 can be coupled to an input of a combiner box 310. In some examples, 3 string combiners 306 can be coupled to a common output node 312 of the combiner box 310. In other examples, more or less string combiners 306 can be in the set of string combiners 306. It is noted that the string combiners 306 and the combiner box 310 can collectively be referred to as a combiner 313 that can represent an instance of the combiner 116 of FIG. 2.

Each output of the combiner box 310 can be coupled to an input of an inverter 314. In the present example, it is presumed that there are R number of outputs of the combiner 310, where R is an integer greater than or equal to one. The inverter 314 can be employed, for example, to implement the inverter 118 of FIG. 2. Additionally, R number of current transducers (CTs) 316 can be coupled to the corresponding R number of outputs of the combiner box 310. In some examples, each current transducer 316 can be employed to implement an instance of the data monitor 120 of FIG. 2.

Each current transducer 316 can (passively) monitor a respective input signal provided to the inverter 314. Moreover, in some examples, each of the current transducers 316 can be integrated with the inverter 314. In such a situation, the inverter 314 can include a data processor 318 that includes a data storage for storing data provided from the current transducers 316 and/or data provided from the inverter 314. In at least one example, the data stored in the data processor 318 can include data characterized in the data table 320. The data processor 318 can be implemented as a computing device (e.g., a microcontroller). It is noted that in some examples, a combination of the data processor 318 and the R number of current transducers 316 (or some subset thereof) can collectively represent a data monitor 120 of FIG. 2.

As explained with respect to FIG. 2, data in the data table 320, which represents data provided from the current transducers 316 and/or the inverter 314, can be provided to a utility server (e.g., the utility server 126 of FIG. 2) periodically and/or asynchronously. Accordingly, as discussed herein the utility server can employ multiple types of statistical analysis to determine whether a potential defect (anomaly) is present at the power provider 300, such that a service crew can be dispatched to inspect and/or correct the potential defect in a timely and efficient manner.

Figure 6:
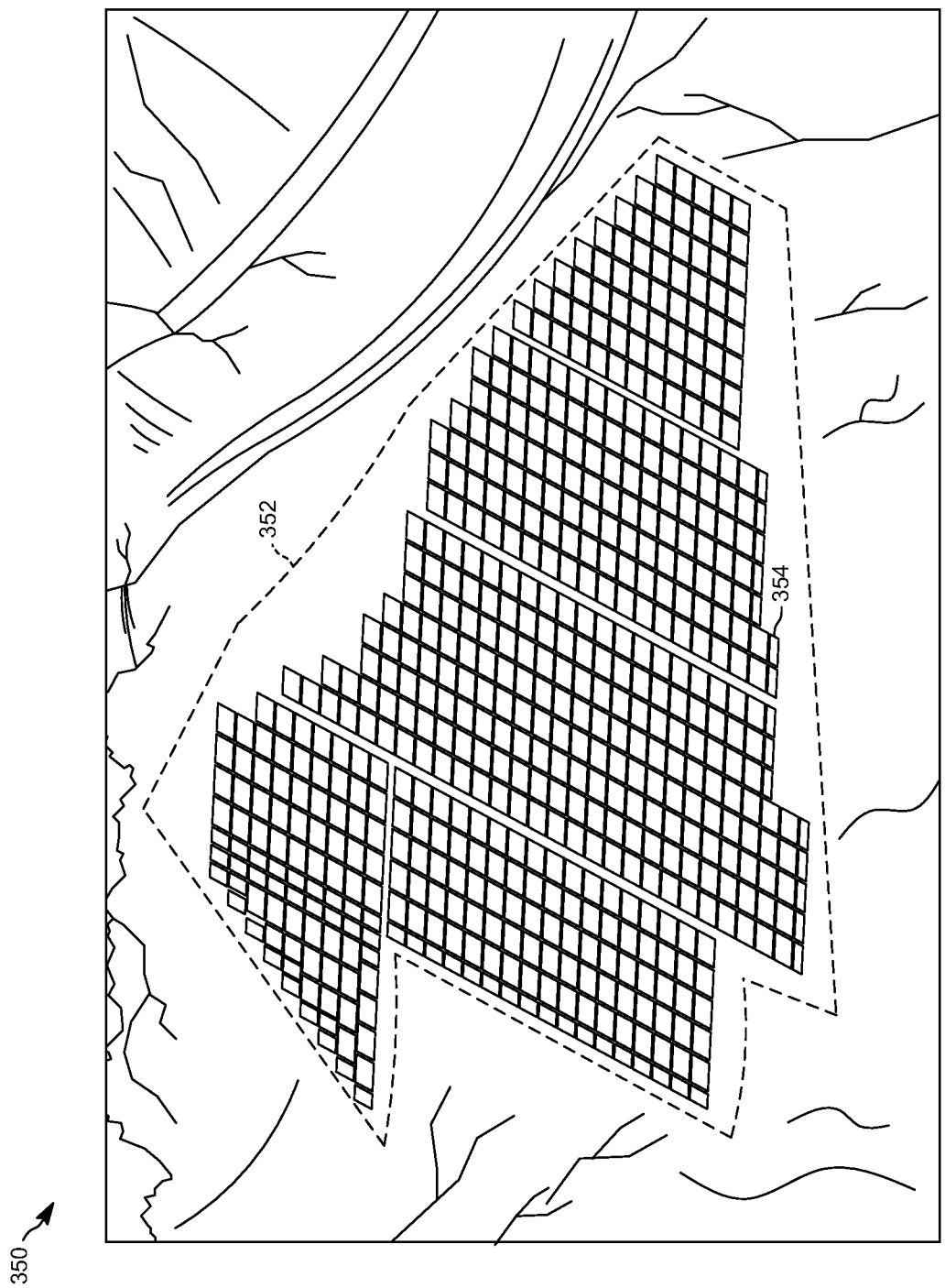
FIG. 6 illustrates an example of a solar array for a power provider.

FIG. 6 illustrates a photograph 350 of a solar array 352 that could be employed in the first example to implement the array 112 of FIG. 2. In such a situation, each photovoltaic module 354 (only one of which is labeled) converts ambient light into DC electrical power. The photovoltaic modules 354 can be connected together in strings, such as the strings 302 of FIG. 5 and/or the strings 115 of FIG. 2.

As illustrated, the sheer number of photovoltaic modules 354 makes manual individual measurement of each photovoltaic module 354 extremely cumbersome. Thus, by employment of the power distribution system 100 of FIG. 2, statistical analysis can be performed on measured data provided from the photovoltaic modules 354 to identify potential defects in the solar array 352.

Figure 7:
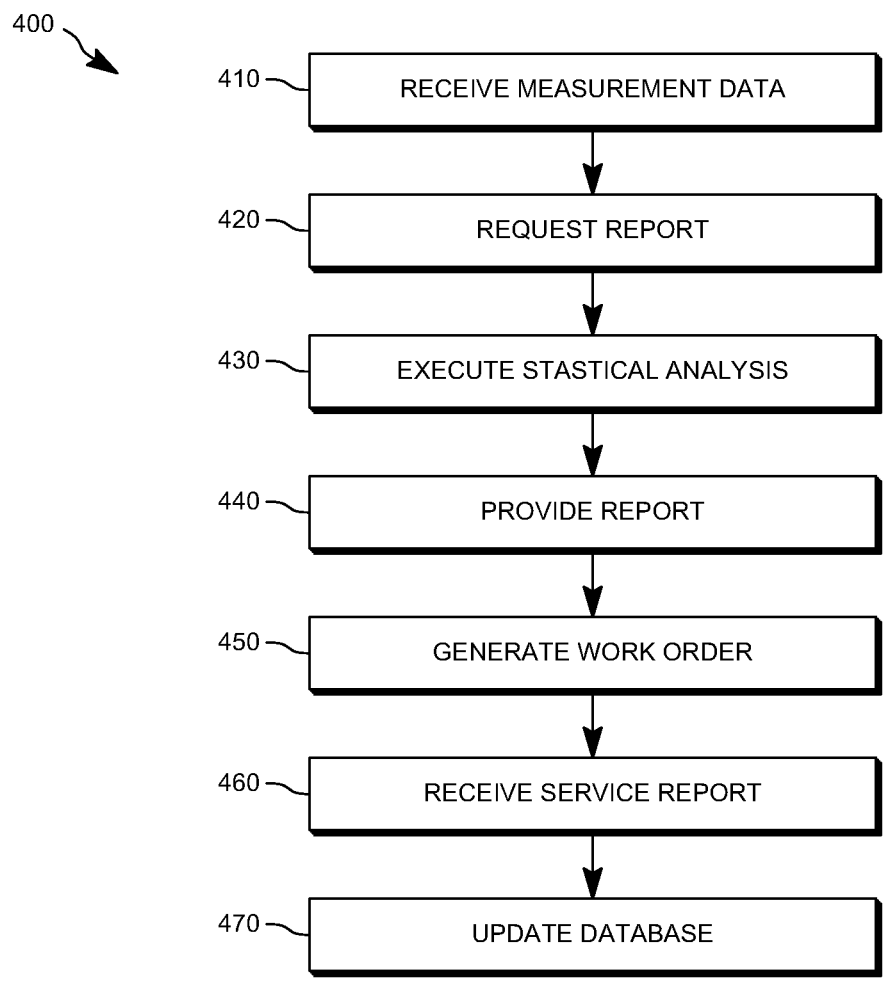
FIG. 7 illustrates a flowchart of an example method for detecting potential defects in a power provider.

In view of the foregoing structural and functional features described above, an example method will be better appreciated with reference to FIG. 7. While, for purposes of simplicity of explanation, the example method of FIG. 7 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 7 illustrates a flowchart of an example method 400 for identifying potential defects (anomalies) in parallel operating power sources of a power provider. The method 400 could be implemented, for example, by the power distribution system 50 of FIG. 1 and/or the power distribution system 100 of FIG. 2.

At 410, a defect detector (e.g., the defect detector 64 of FIG. 1 and/or the defect detector 132 of FIG. 2) can receive measurement data from each of a plurality of data monitors (e.g., the data monitor 60 of FIG. 1 and/or the data monitors 120 of FIG. 2). The measurement data can characterize an operational performance of each of a plurality of power sources of the power provider. The measurement data could be, for example, an output current, voltage, power and/or a heat sink temperature.

At 420, the defect detector can receive a request for a report (e.g., an operational report). At 430, the defect detector can execute statistical analysis on the measurement data to identify power sources with a potential defect based on criteria identified in the report request. As described herein, the statistical analysis can include a calculation of a Z-score, a normalized distribution and a Mahalanobis distance for each set of the power sources of the power provider. At 440, the defect detector can provide a report (in response to the report request) that identifies a set of the power sources that has a potential defect.

At 450, a work order (e.g., a service ticket) can be generated by a service ticket manager (e.g., the service ticket manager 68 of FIG. 1 and/or the service ticket manager 142 of FIG. 2) for inspection of each power sources in the set of power sources. At 460, the defect detector receives a service report characterizing the results of an inspection of the set of power sources that has a potential defect. At 470, a database with historical data can be updated based on the service report.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory machine readable medium having machine executable instructions, the machine executable instructions comprising:
a defect detector that receives measured data characterizing an operational performance of a population of sets of parallel operating power sources of a power supplier for a power distribution system, the defect detector employing statistical analysis to detect a potential defect in a subset of the parallel operating power sources of the power supplier based on the measured data, wherein the measured data comprises a given amount of power that is output by each of the sets of parallel operating sources;
wherein each of the parallel operating power sources is configured to the given amount of power in response to a given stimulus; and
wherein the defect detector receives a service report that characterizes results of an inspection of the set of power sources that has a potential defect for a given parallel operating power source of the subset of the parallel operating power sources, and the service report indicates that the results of the inspection indicate that the given parallel operating power source is operating properly.

2. The non-transitory medium of claim 1, wherein the measured data comprises an electrical current output by each of the sets of parallel operating power sources.

3. The non-transitory medium of claim 1, wherein the defect detector updates a scaling factor of the given parallel operating power source of the subset of parallel operating power sources in response to the service report.

4. A non-transitory machine readable medium having machine executable instructions, the machine executable instructions comprising:
a defect detector that receives measured data characterizing an operational performance of a population of sets of parallel operating power sources of a power supplier for a power distribution system, the defect detector employing statistical analysis to detect a potential defect in a subset of the parallel operating power sources of the power supplier based on the measured data, wherein the measured data comprises a given amount of power that is output by each of the sets of parallel operating power sources;
wherein each of the parallel operating power sources is configured to output the given amount of power in response to a given stimulus; and
wherein the defect detector comprises a Z-score calculator that determines a Z-score for each set of parallel power sources, wherein the Z-score characterizes the operational performance of a given parallel power source as a function of a mean of the operational performance of the population of sets of parallel power sources.

5. A non-transitory machine readable medium having machine executable instructions, the machine executable instructions comprising:
a defect detector that receives measured data characterizing an operational performance of a population of sets of parallel operating power sources of a power supplier for a power distribution system, the defect detector employing statistical analysis to detect a potential defect in a subset of the parallel operating power sources of the power supplier based on the measured data, wherein the measured data comprises a given amount of power that is output by each of the sets of parallel operating power sources;
wherein each of the parallel operating power sources is configured to output the given amount of power in response to a given stimulus; and
wherein the defect detector comprises a interquartile range (IQR) calculator that determines a normalized distribution for each set of parallel power sources, wherein the normalized distribution characterizes the operational performance of a given power source as a function of a median of the operational performance of the population of sets of parallel power sources.

6. A non-transitory machine readable medium having machine executable instructions, the machine executable instructions comprising:
a defect detector that receives measured data characterizing an operational performance of a population of sets of parallel operating power sources of a power supplier for a power distribution system, the defect detector employing statistical analysis to detect a potential defect in a subset of the parallel operating power sources of the power supplier based on the measured data, wherein the measured data comprises a given amount of power that is output by each of the sets of parallel operating sources;
wherein each of the parallel operating power sources is configured to output the given amount of power in response to a given stimulus; and
wherein the defect detector comprises a Mahalanobis distance calculator that determines a Mahalanobis distance for each set of parallel power sources, wherein the Mahalanobis distance characterizes the operational performance as a function of a mean of the operational performance of the population of sets of parallel power sources, wherein the measured data characterizing the operational performance includes at least two parameters.

7. The non-transitory medium of claim 6, wherein the at least two parameters comprises an electrical current output by each of the sets of parallel operating power sources and a temperature of heat-sinks associated with each of the plurality of parallel operating power sources.

8. A non-transitory machine readable medium having machine executable instructions, the machine executable instructions comprising:
a defect detector that receives measured data characterizing an operational performance of a population of sets of parallel operating power sources of a power supplier for a power distribution system, the defect detector employing statistical analysis to detect a potential defect in a subset of the parallel operating power sources of the power supplier based on the measured data, wherein the measured data comprises a given amount of power that is output by each of the sets of parallel operating sources;
a data manager that generates an aggregated defect list that identifies the subset of the sets of parallel operating power sources that have the potential defect based on the statistical analysis; and
a pattern detector that matches at least one parallel operating power source in the subset of the sets of parallel operating sources with a set of instructions for remedying the potential defect,
wherein each of the parallel operating power sources is configured to output the given amount of power in response to a given stimulus.

9. A method comprising:
receiving measurement data from a plurality of data monitors that characterizes the operational performance of a plurality of power sources of a power provider for a power distribution system operating in parallel, wherein the measurement data comprises a power that is output by each of the plurality of power sources operating in parallel; and
executing statistical analysis on the measurement data to identify a set of power sources that have a potential defect;
wherein each of the plurality of power sources is designed to provide a same output in response to a same stimulus and the statistical analysis includes calculation of a Z-score, a normalize distribution and a Mahalanobis distance for the power sources based on the measurement data, wherein each of the Z-score, the normalize distribution and the Mahalanobis distance characterize an operational performance of at least one given power source relative to the operational performance of the plurality of power sources.

10. The method of claim 9, wherein the measurement data includes a current output by the plurality of power sources.

11. A method comprising:
receiving measurement data from a plurality of data monitors that characterizes the operational performance of a plurality of power sources of a power provider for a power distribution system operating in parallel, wherein the measurement data comprises a power that is output by each of the plurality of power sources operating in parallel;
executing statistical analysis on the measurement data to identify a set of power sources of the plurality of power sources that have a potential defect;
changing a scaling factor for a subset of the plurality power sources based on a service report indicating that the subset of the plurality of power sources is operating properly;
wherein each of the plurality of power sources is designed to provide a same output in response to a same stimulus.

* * * * *